(12) United States Patent
Rofougaran

(10) Patent No.: US 8,090,314 B2
(45) Date of Patent: Jan. 3, 2012

(54) METHOD AND SYSTEM FOR COMMUNICATING VIA A FREQUENCY SHIFTING REPEATER

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 645 days.

(21) Appl. No.: 12/057,780

(22) Filed: Mar. 28, 2008

(65) Prior Publication Data
US 2009/0247109 A1   Oct. 1, 2009

(51) Int. Cl.
*H04B 7/14* (2006.01)
*H04K 3/00* (2006.01)
(52) U.S. Cl. ............................................. 455/22; 455/7
(58) Field of Classification Search ................. 455/7–22; 370/315; 375/211
See application file for complete search history.

(56) References Cited

U.S. PATENT DOCUMENTS

| | | | |
|---|---|---|---|
| 5,200,955 A * | 4/1993 | McFarlane et al. ........... | 370/315 |
| 6,697,603 B1 | 2/2004 | Lovinggood et al. | |
| 7,813,451 B2 | 10/2010 | Binder et al. | |
| 2007/0155348 A1* | 7/2007 | Razavi et al. ................. | 455/118 |
| 2009/0247213 A1 | 10/2009 | Rofougaran | |
| 2009/0278596 A1* | 11/2009 | Rofougaran et al. ......... | 329/302 |
| 2009/0279593 A1 | 11/2009 | Rofougaran et al. | |
| 2009/0280768 A1 | 11/2009 | Rofougaran et al. | |
| 2009/0316829 A1 | 12/2009 | Rofougaran | |
| 2009/0318086 A1 | 12/2009 | Rofougaran | |
| 2010/0159859 A1 | 6/2010 | Rofougaran | |

* cited by examiner

*Primary Examiner* — Lee Nguyen
(74) *Attorney, Agent, or Firm* — McAndrews, Held & Malloy, Ltd.

(57) ABSTRACT

Aspects of a method and system for communicating via a frequency shifting repeater are provided. In this regard, a signal having a first frequency may be received, the received signal may be quadrature down-converted by mixing it with a pair of phase-quadrature local oscillator (LO) signals, the down-converted signals may be up-converted by mixing them with the LO signals, and the up-converted signals may be added or subtracted to generate a signal, having a second frequency, for transmission. In this manner, a wireless communication range may be extended by repeating the received signal on a different frequency than at which it was received. The frequency of the LO signals may be based on a desired difference between the first and second frequencies, a frequency at which a target device receives signals, and/or noise present.

18 Claims, 4 Drawing Sheets

METHOD AND SYSTEM FOR COMMUNICATING VIA A FREQUENCY SHIFTING REPEATER

CROSS-REFERENCE TO RELATED APPLICATIONS/INCORPORATION BY REFERENCE

Not applicable.

FIELD OF THE INVENTION

Certain embodiments of the invention relate to signal processing. More specifically, certain embodiments of the invention relate to a method and system for communicating via a frequency shifting repeater.

BACKGROUND OF THE INVENTION

As the number of wireless devices and wireless standards continue to grow, wireless communications are increasingly being relied upon to exchange information. For example, Bluetooth, Wi-Fi, and cellular communications (e.g., GSM) are just a few examples of well established wireless communications commonly utilized in today's technology driven societies.

In this regard, although different wireless networks may have widely varying characteristics, a common element in many wireless communication networks is a signal repeater. In this regard, a repeater may receive a wireless signal and re-transmit that signal at a higher power than that which was received. In this manner, repeaters may enable extending the range of a wireless network. Conventional repeaters, however, may be too expensive and/or limited in performance to be useful in many wireless communication networks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for communicating via a frequency shifting repeater, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for communicating via a frequency shifting repeater. In various embodiments of the invention, a signal having a first frequency may be received, the received signal may be quadrature down-converted by mixing it with a pair of phase-quadrature local oscillator (LO) signals, the down-converted signals may be up-converted by mixing them with the LO signals, and the up-converted signals may be added or subtracted to generate a signal, having a second frequency, for transmission. In this manner, a wireless communication range may be extended by repeating the received signal on a different frequency than at which it was received. The frequency of the LO signals may be based on a desired difference between the first frequency and the second frequency, a frequency at which one or more target devices receives signals, and/or noise present. Whether the up-converted signals are added or subtracted may depend on the polarity of the LO signals. The first and/or second frequency may be in or near the industrial, scientific, and medical band from 61 GHz to 61.5 GHz. Each of a plurality of target devices to which the signal having second frequency may be transmitted may receive signals on a unique frequency.

Figure 1:
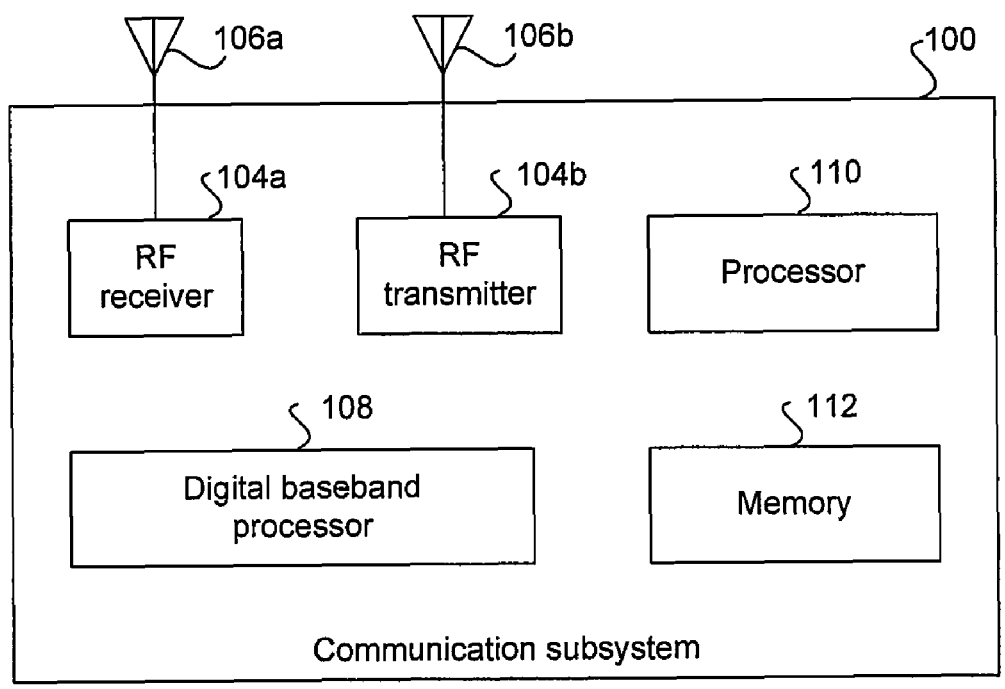
FIG. 1 is a block diagram illustrating an exemplary communication subsystem, which may be utilized in connection with an embodiment of the invention.

FIG. 1 is a block diagram illustrating an exemplary communication subsystem, which may be utilized in accordance with an embodiment of the invention. Referring to FIG. 1, there is shown a communication subsystem 100, an RF receiver 104a, an RF transmitter 104b, a receive antenna 106a, a transmit antenna 106b, a digital baseband processor 108, a processor 110, and a memory 112.

The communication subsystem 100 may comprise the RF receiver 104a, the RF transmitter 104b, the receive antenna 106a, the transmit antenna 106b, the digital baseband processor 108, the processor 110, the memory 112, and may also comprise additional suitable logic, circuitry, and/or code that may enable receiving, transmitting, and processing of RF signals. For example, the communication subsystem 100 may be integrated or located within a wireless device to enable operations in a wireless system, such as the cellular network and/or digital video broadcast network.

The receive antenna 106a may comprise suitable logic, circuitry, and/or code that may enable reception of RF signals. The receive antenna 106a may be communicatively coupled to the RF receiver 104a. The RF receiver 104a may comprise suitable logic, circuitry, and/or code that may enable processing of received RF signals. The RF receiver 104a may down-convert received RF signals to a baseband frequency signal. The RF receiver 104a may perform direct down-conversion of the received RF signals to a baseband frequency signal, for example. In some instances, the RF receiver 104a may enable analog-to-digital conversion of the baseband signal components before transferring the components to the digital baseband processor 108. In other instances, the RF receiver 104a may transfer the baseband signal components in analog form. In various embodiments of the invention, the RF receiver 104a may enable receiving extremely high frequency (EHF) signals at, for example, approximately 60 GHz. In this regard, the RF receiver 104a may be enabled to generate signals, such as local oscillator signals, for the reception and processing of EHF signals. In various embodiments of the invention, the receive antenna 106a and the RF receiver 104a may enable reception of non-EHF RF signals. For example, the receive antenna 106a and the RF receiver 104a may enable receiving and/or processing of Bluetooth RF signals.

The transmit antenna 106b may comprise suitable logic, circuitry, and/or code that may enable transmission of RF signals; the transmit antenna 106b may be communicatively coupled to the RF transmitter 104b. The RF transmitter 104b may comprise suitable logic, circuitry, and/or code that may enable processing of RF signals for transmission. The RF transmitter 104b may up-convert the baseband frequency signal to an RF signal. The RF transmitter 104b may perform direct up-conversion of the baseband frequency signal to a RF signal. In some instances, the RF transmitter 104b may enable digital-to-analog conversion of the baseband signal components received from the digital baseband processor 108 before up conversion. In other instances, the RF transmitter 104b may receive baseband signal components in analog form. In various embodiments of the invention, the RF transmitter 104b may enable transmission of extremely high frequency (EHF) signals at, for example, approximately 60 GHz. In this regard, the RF transmitter 104b may be enabled to generate signals, such as local oscillator signals, for the transmission and processing of EHF signals. In various embodiments of the invention, the transmit antenna 106b and the RF transmitter 104b may enable transmission of non-EHF RF signals. For example, the transmit antenna 106b and the RF transmitter 104b may enable transmitting and/or processing of Bluetooth RF signals.

The digital baseband processor 108 may comprise suitable logic, circuitry, and/or code that may enable processing and/or handling of baseband frequency signals. In this regard, the digital baseband processor 108 may process or handle signals received from the RF receiver 104a and/or signals to be transferred to the RF transmitter 104b. The digital baseband processor 108 may also provide control and/or feedback information to the RF receiver 104a and to the RF transmitter 104b based on information from the processed signals. The digital baseband processor 108 may communicate information and/or data from the processed signals to the processor 110 and/or to the memory 112. Moreover, the digital baseband processor 108 may receive information from the processor 110 and/or to the memory 112, which may be processed and transferred to the RF transmitter 104b for transmission to the network.

The processor 110 may comprise suitable logic, circuitry, and/or code that may enable control and/or data processing operations for the communication subsystem 100. The processor 110 may be utilized to control at least a portion of the RF receiver 104a, the RF transmitter 104b, the digital baseband processor 108, and/or the memory 112. In this regard, the processor 110 may generate at least one signal for controlling operations within the communication subsystem 100. The processor 110 may also enable executing of applications that may be utilized by the communication subsystem 100. For example, the processor 110 may execute applications that may enable displaying and/or interacting with content received via RF signals in the communication subsystem 100.

The memory 112 may comprise suitable logic, circuitry, and/or code that may enable storage of data and/or other information utilized by the communication subsystem 100. For example, the memory 112 may be utilized for storing processed data generated by the digital baseband processor 108 and/or the processor 110. The memory 112 may also be utilized to store information, such as configuration information, that may be utilized to control the operation of at least one block in the communication subsystem 100. For example, the memory 112 may comprise information necessary to configure the RF receiver 104a to enable receiving signals in the appropriate frequency band.

In operation, the communication subsystem 100 may enable communication via one or more RF interfaces. The communication subsystem 100 may be integrated within a wireless device to enable wireless communications. For example, the communication subsystem 100 may receive RF signals via the receive antenna 106a; wherein the RF receiver 104a may enable initial processing of the received signal. The communication subsystem 100 may transmit RF signals operating via the RF transmitter 104b and the transmit antenna 106b. The digital baseband processor 108, the processor 110, and the memory 112 may enable performing control and/or related operation during transmission and/or reception of RF signals. For example, the memory 112 may be utilized to store and/or fetch data that may be received and/or transmitted via RF signals. The digital baseband processor 108 may enable performing signal processing operations such as analog-to-digital conversion, encoding/decoding of received and/or transmitted data via the RF signals. The processor 110 may enable controlling of the operations of the communication subsystem 100. For example, the processor 110 may enable controlling the transmit and/or the receive antennas to enable alignment during wireless communications.

In various embodiments of the invention, the communication subsystem 100 may enable EHF communications, which may have limited operational range compared with lower frequency RF interfaces. Accordingly, the communication subsystem 100 may be enabled to utilize other wireless interfaces and/or protocols. For example, the communication subsystem 100 may be enabled to utilize such wireless interfaces such as Bluetooth. The non-EHF interfaces that may be supported in the communication subsystem 100 may be utilized to send information regarding the communication subsystem 100. For example, a Bluetooth connection may be utilized to send information regarding the capability of the communication subsystem 100 and/or to receive messages containing information regarding preferred setting that may be utilized while performing EHF communication.

In various embodiments of the invention, repeater devices may be utilized to extend the range of communications between wireless devices that may comprise the communication subsystem 100. In this regard, wireless communications may generally have limited range and it may be desirable to utilize other devices, for example, repeater devices, to extend the range of communications between wireless devices. While it may be desirable to utilize repeater devices in forwarding RF signals between wireless devices, mechanisms that prevent and/or reduce interference between receive and transmit RF signals at such repeater devices may be necessary. Accordingly, aspects of the invention may enable repeating (retransmitting) a signal at a different frequency than the frequency at which the signal was received.

Figure 2:
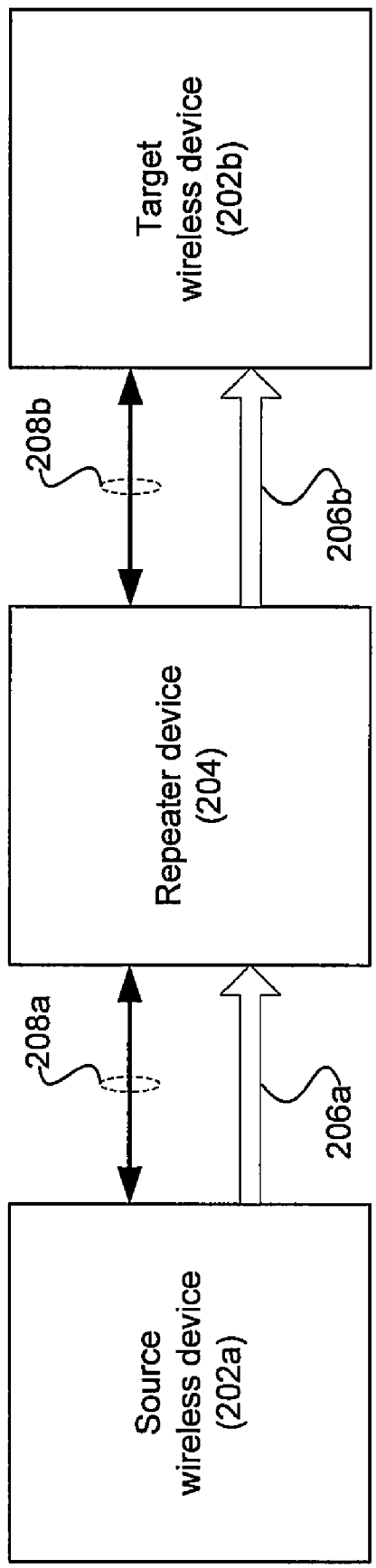
FIG. 2 is a block diagram illustrating a repeater device utilized to forward communications between two wireless devices, in accordance with an embodiment of the invention.

FIG. 2 is a block diagram illustrating a repeater device utilized to forward wireless communications between two wireless devices, in accordance with an embodiment of the invention. Referring to FIG. 2, there is shown a source wireless device 202a, a target wireless device 202b, a repeater device 204, data connections 206a and 206b, and control connections 208a and 208b.

The source wireless device 202a and the target wireless device 202b may each comprise suitable logic, circuitry, and/or code that may enable receiving, transmitting, and processing of RF signals. For example, the source wireless device 202a and the target wireless device 202b may each comprise the communication subsystem 100, substantially as described with respect to FIG. 1.

The repeater device 204 may comprise suitable logic, circuitry, and/or code that may enable reception and/or transmission of RF signals to facilitate forwarding RF signals from the source wireless device 202a to the target wireless device 202b. Additionally, the repeater device 204 may comprise suitable logic, circuitry, and/or code that may enable establishing and/or utilizing control connections 208a and 208b with the source wireless device 202a and/or target wireless device 202b, respectively.

The connections 206a and 206b may each comprise a radio frequency (RF) and/or wireless link that may enable high speed data communications. For example, the connections 206a and 206b may be point-to-point connections operation at or near the 61 GHz to 61.5 GHZ ISM band. The control connections 208a and 208b may each comprise a radio frequency (RF) and/or wireless link that may be based on a wireless protocol such as Bluetooth, which may be utilized to communicate control messages between the source wireless device 202a and the repeater device 204, and between the repeater device 204 and the target device 202b, respectively.

In operation, the repeater device 204 may enable forwarding RF signals transmitted from the source wireless device 202a via the connection 206a, to the target wireless device 202b via the connection 206b. For example, extremely high frequency (EHF) communications), such as the ISM band near 60 GHz, may generally have limited range, typically operating only in "line-of-sight" settings. Consequently, it may be desirable to utilize other devices, for example, repeater devices such as the repeater device 204, to extend the range of and/or redirect signals communicated between wireless devices.

While it may be desirable to utilize the repeater device 204 in forwarding RF signals between the source wireless device 202a and the target wireless device 202b; mechanisms that prevent and/or reduce interference between receive and transmit RF signals at the repeater device 204 may be necessary. Accordingly, aspects of the invention may enable repeating (retransmitting) a signal at a different frequency than the frequency at which the signal was received. In this regard, the target device 202b may receive at a different frequency than the source device 202a may transmit. In this manner, exemplary embodiments of the invention may select a target device based on a frequency shift applied to a repeated signal. For example, a plurality of target devices 202b may be present and may each receive signals on a different frequency. Additionally, a frequency shift applied to the repeated signal may be determined based on the environment in which the devices 202 and repeater 204 are operating. For example, in instances that certain frequencies may be congested and/or noisy, a frequency shift, which may avoid those frequencies, may be utilized.

Figure 3:
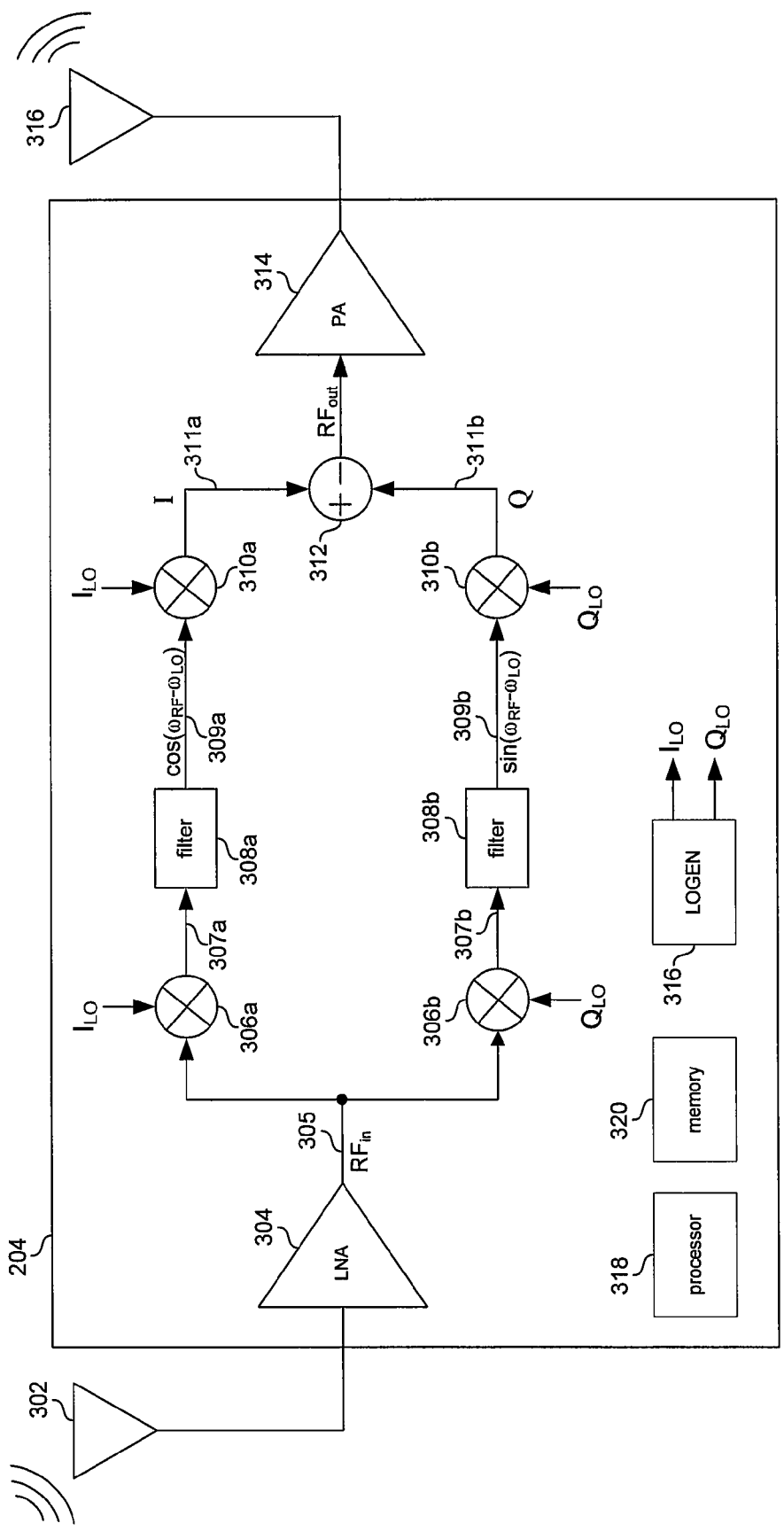
FIG. 3 is a diagram of an exemplary frequency shifting repeater, in accordance with an embodiment of the invention.

FIG. 3 is a diagram of an exemplary frequency shifting repeater, in accordance with an embodiment of the invention. Referring to FIG. 3, the repeater 204 may comprise a low noise amplifier (LNA) 304, mixers 306a, 306b, 310a, and 310b, filters 308a and 308b, adder 312, power amplifier (PA) 314, local oscillator generator (LOGEN) 316, processor 318, and memory 320. The repeater 204 may comprise or be communicatively coupled to antennas 302 and 316.

The antennas 302 and 316 may be similar to, or the same as, the antennas 106a and 106b described with respect to FIG. 1.

The LNA 304 may comprise suitable logic, circuitry, and/ or code that may enable buffering and/or amplification of received RF signals. In this regard, the gain of the LNA 304 may be adjustable to enable reception of signals of varying strength. Accordingly, the LNA 304 may receive one or more control signals from the processor 318 and/or the memory 320.

The mixers 306a and 306b may each comprise suitable logic, circuitry, and/or code that may enable generation of inter-modulation products resulting from mixing the received signal $RF_{IN}$ with in-phase LO signal $I_{LO}$ and the quadrature-phase LO signal $Q_{LO}$, respectively. Similarly, the mixers 310a and 310b may each comprise suitable logic, circuitry, and/or code that may enable generation of inter-modulation products resulting from mixing the filter outputs 309a and 309b with $I_{LO}$ and $Q_{LO}$, respectively.

The filters 308a and 308b may each comprise suitable, logic, and/or code that may enable passing frequencies at or near a desired intermediate frequency (IF) and attenuating other frequencies. In this regard, the IF may be given by $f_{305}-f_{LO}$, where $f_{305}$ may be the frequency of the signal 305 output by the LNA 304 and $f_{LO}$ may be the frequency of the local oscillator signal output by the LOGEN 316. In various embodiments of the invention, the bandwidth, attenuation, and/or center frequency of each of the filters 308a and 308b may be adjustable based on one or more control signals. Accordingly, the filters 308a and 308b may each receive one or more control signals from the processor 318 and/or the memory 320.

The adder 312 may comprise suitable logic, circuitry, and/ or code for combining the signals 311a and 311b to generate an RF signal. In this regard, the adder may be enabled to add signal 311a to signal 311b, subtract signal 311a from signal 311b, and/or subtract signal 311b from signal 311a. In this regard, the adder 312 may receive one or more control signals to determine whether addition or subtraction may be performed. Furthermore, the selection of addition or subtraction may depend on the phasing and/or polarity of the signals $I_{LO}$, $Q_{LO}$, 309a, and 309b. For example, $I_{LO}$ may be $\cos(\omega_{LO}t)$ and $Q_{LO}$ may be $\sin(\omega_{LO}t)$ and addition may be selected such that the output of the adder 312 may be $\cos(\omega_{IF}t-\omega_{LO}t)$, where $\omega_{IF}=\omega_{RFin}-\omega_{LO}$. Alternatively, $I_{LO}$ may be $\cos(\omega_{LO}t)$ and $Q_{LO}$ may be $-\sin(\omega_{LO}t)$ and subtraction may be selected such that the output of the adder 312 may be $\cos(\omega_{IF}t-\omega_{LO}t)$, where $\omega_{IF}=\omega_{RFin}-\omega_{LO}$.

The PA 314 may comprise suitable logic, circuitry, and/or code that may enable buffering and/or amplification of an RF signal and outputting the signal to an antenna for transmission. In this regard, the gain of the PA 314 may be adjustable and may enable transmitting signals of varying strength. Accordingly, the PA 314 may receive one or more control signals from the processor 318 and/or the memory 320.

The LOGEN 316 may comprise suitable logic, circuitry, and/or code that may enable generating reference signals $I_{LO1}$ and $Q_{LO1}$. In various embodiments of the invention, the signal generator 316 may comprise, for example, one or more VCO's, PLLs, and/or direct digital frequency synthesizers (DDFSs). The frequency of the LO signals output by the LOGEN 316 may be determined based on one or more control signals from the processor 318 and/or the memory 320.

The processor 318 may be similar to or the same as the processors 108 and/or 110 described with respect to FIG. 1. In this regard, the processor may be enabled to control operations of the repeater 204. For example, the processor 318 may provide one or more control signals for configuring the filters 308 and/or the LOGEN 316.

The memory 320 may be similar to or the same as the memory 112 described with respect to FIG. 1. In this regard, the processor 318 may be enabled to store received data and/or information for configuring and/or operating the repeater 304. For example, the memory 320 may store information for configuring the filters 308 and/or the LOGEN 316.

In operation, a signal may be received via the antenna 302 and amplified by the LNA 304 to generate the signal $RF_{in}$. The mixers 306a and 306b may mix $RF_{in}$ with the LO signals. In this regard, the processor 318 and/or the memory 320 may provide one or more signals for controlling the frequency of the LO signals output by the LOGEN 316. The filters 308a and 308b may filter the output of the mixers 306a and 306b to generate intermediate frequency (IF) signals 309a and 309b. In this regard, the processor 318 and/or the memory 320 may provide one or more signals for controlling the response of the filters 308a and 308b. The mixers 306a and 306b may mix the IF signals 309a and 309b with the LO signals to generate signals 311a and 311b. The adder 312 may add or subtract the signals 311a and 311b to generate $RF_{out}$. In this manner, $RF_{out}$ may be generated by frequency shifting $RF_{in}$, by $2*f_{LO}$, where $f_{LO}$ is the frequency of the LO signal output by the LOGEN 316. Additional details of operation of the repeater 204 may are described below with respect to FIG. 4.

Figure 4:
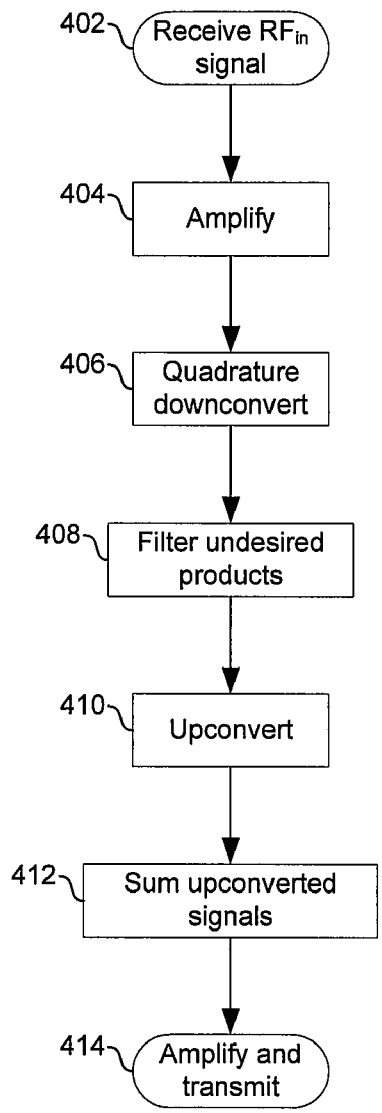
FIG. 4 is a flow chart illustrating exemplary operation of a frequency shifting repeater, in accordance with an embodiment of the invention.

FIG. 4 is a flow chart illustrating exemplary operation of a frequency shifting repeater, in accordance with an embodiment of the invention. Referring to FIG. 4 the exemplary steps may begin with step 402 when a signal may be received by the repeater 204. Subsequent to step 402, the exemplary steps may advance to step 404. In step 404, the received RF signal may be amplified by the low noise amplifier 304. Subsequent to step 404, the exemplary steps may advance to step 406. In step 406, the amplified RF signal 305 output by the LNA 304 may be quadrature down converted. In this regard, the mixer 306a may mix the signal 305 with an in-phase local oscillator signal, $I_{LO}$, and the mixer 306b may mix the signal 305 with a quadrature-phase local oscillator signal, $Q_{LO}$. Subsequent to step 406, the exemplary steps may advance to step 408.

In step 408, the signals 307a and 307b output by the mixers 306a and 306b may be filtered to remove undesired mixer products. In this regard, the filter 308a may low pass filter the signal 307a and output $\cos(\omega_{RF}-\omega_{LO})$ and the filter 308b may low pass filter the signal 307b and output $\sin(\omega_{RF}-\omega_{LO})$. Subsequent to step 408, the exemplary steps may advance to step 410. In step 410, the filtered signals 309a and 309b may be up-converted. In this regard, the mixer 310a may mix the signal 309a with the in-phase LO signal and the mixer 310b may mix the signal 309b with the quadrature-phase LO signal. Subsequent to step 410, the exemplary steps may advance to step 412.

In step 412, the up-converted signals 311a and 311b may be summed to generate the $RF_{out}$ signal. Accordingly, the $RF_{out}$ may be frequency shifted relative to the $RF_{in}$ signal by an amount equal to (within a tolerance) $2(RF_{in}-LO)$. For example, if $RF_{in}$ is 61.5 GHz and the LO is 250 MHz then $RF_{out}$ may be 61 GHz. In this manner, a received signal may be repeated on a different frequency than the frequency on which it is received. In this regard, the frequency of the transmitted signal may be determined based on a desired frequency separation between the received signal and the repeated signal, or based on a frequency of operation of a target device. Subsequent to step 412, the exemplary steps may advance to step 414.

In step 414, $RF_{out}$ may be amplified by the PA 314 and transmitted via the antenna 316 to a target device such as the device 202b. In this regard, the frequency shift applied to the repeated signal may be determined based on a receive frequency of the target device.

Aspects of a method and system for communicating via a frequency shifting repeater are provided. In various embodiments of the invention, a signal, $RF_{in}$, having a first frequency may be received by the antenna 302, mixers 306a and 306b may quadrature down-convert the received signal by mixing it with a pair of phase-quadrature local oscillator (LO) signals, the mixers 310a and 310b may up-convert the down-converted signals by mixing them with the LO signals, and the adder 312 may add or subtract the up-converted signals to generate a signal $RF_{out}$, having a second frequency, for transmission via the antenna 316. In this manner, a wireless communication range may be extended by repeating the received signal on a different frequency than at which it was received. The frequency of the LO signals may be based on a desired difference between the first frequency and the second frequency, based on a frequency at which one or more target devices, such as the device 202b, receives signals, and/or based on noise present in and/or around the repeater 204. Whether the up-converted signals are added or subtracted may depend on the polarity of the LO signals. The first and/or second frequency may be in or near the industrial, scientific, and medical band from 61 GHz to 61.5 GHz. Each of a plurality of target devices to which the signal having second frequency may be transmitted, such as the target device 202b, may receive signals on a unique frequency.

Another embodiment of the invention may provide a machine-readable storage, having stored thereon, a computer program having at least one code section executable by a machine, thereby causing the machine to perform the steps as described herein for communicating via a frequency shifting repeater.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:
1. A method, comprising:
   in communication device:
      receiving a signal having a first frequency;
      quadrature down-converting said received signal by mixing said received signal with a pair of phase-quadrature local oscillator signals, wherein said first frequency of said pair of phase-quadrature local oscillator signals is determined based on noise present in and/or around said communication device;

up-converting said down-converted received signals by mixing said down-converted signals with said pair of phase-quadrature local oscillator signals; and transmitting a signal having a second frequency, wherein said signal having said second frequency is generated by adding or subtracting said up-converted signals.

2. The method according to claim 1, comprising determining a frequency of said pair of local oscillator signals based on a desired difference between said first frequency and said second frequency.

3. The method according to claim 1, comprising determining whether to add or subtract said up-converted signals based on a polarity of said local oscillator signals.

4. The method according to claim 1, wherein said first frequency is in or near the industrial, scientific, and medical band from 61 GHz to 61.5 GHz.

5. The method according to claim 1, wherein said second frequency is in or near the industrial, scientific, and medical band from 61 GHz to 61.5 GHz.

6. The method according to claim 1, comprising determining said frequency of said pair of local oscillator signals based on a frequency at which one or more of a plurality of target devices receives signals.

7. The method according to claim 6, wherein each of said plurality of target devices receives signals on a unique frequency.

8. The method according to claim 1, wherein said communication device extends a wireless communication range.

9. The method according to claim 1, comprising low pass filtering said down-converted signals.

10. A system comprising:
one or more circuits of a communication device, said one or more circuits being operable to:
receive a signal having a first frequency;
quadrature down-convert said received signal by mixing said received signal with a pair of phase-quadrature local oscillator signals, wherein said first frequency of said pair of phase-quadrature local oscillator signals is determined based on noise present in and/or around said communication device;
up-convert said down-converted received signals by mixing said down-converted signals with said pair of phase-quadrature local oscillator signals; and
transmit a signal having a second frequency, wherein said signal having a second frequency is generated by adding or subtracting said up-converted signals.

11. The system according to claim 10, wherein said one or more circuits determine a frequency of said pair of local oscillator signals based on a desired difference between said first frequency and said second frequency.

12. The system according to claim 10, wherein said one or more circuits determine whether to add or subtract said up-converted signals based on a polarity of said local oscillator signals.

13. The system according to claim 10, wherein said first frequency is in or near the industrial, scientific, and medical band from 61 GHz to 61.5 GHz.

14. The system according to claim 10, wherein said second frequency is in or near the industrial, scientific, and medical band from 61 GHz to 61.5 GHz.

15. The system according to claim 10, wherein said one or more circuits determine said frequency of said pair of local oscillator signals based on a frequency at which one or more of a plurality of target devices receives signals.

16. The system according to claim 15, wherein each of said plurality of target devices receives signals on a unique frequency.

17. The system according to claim 10, wherein said communication device extends a wireless communication range.

18. The system according to claim 10, wherein said one or more circuits comprise a low pass filter for filtering said down-converted signals.

* * * * *